No. 718,928. PATENTED JAN. 20, 1903.
A. HAMMOND & E. R. WADDELL.
HEATING OR COOLING APPARATUS.
APPLICATION FILED JUNE 6, 1901.
NO MODEL.
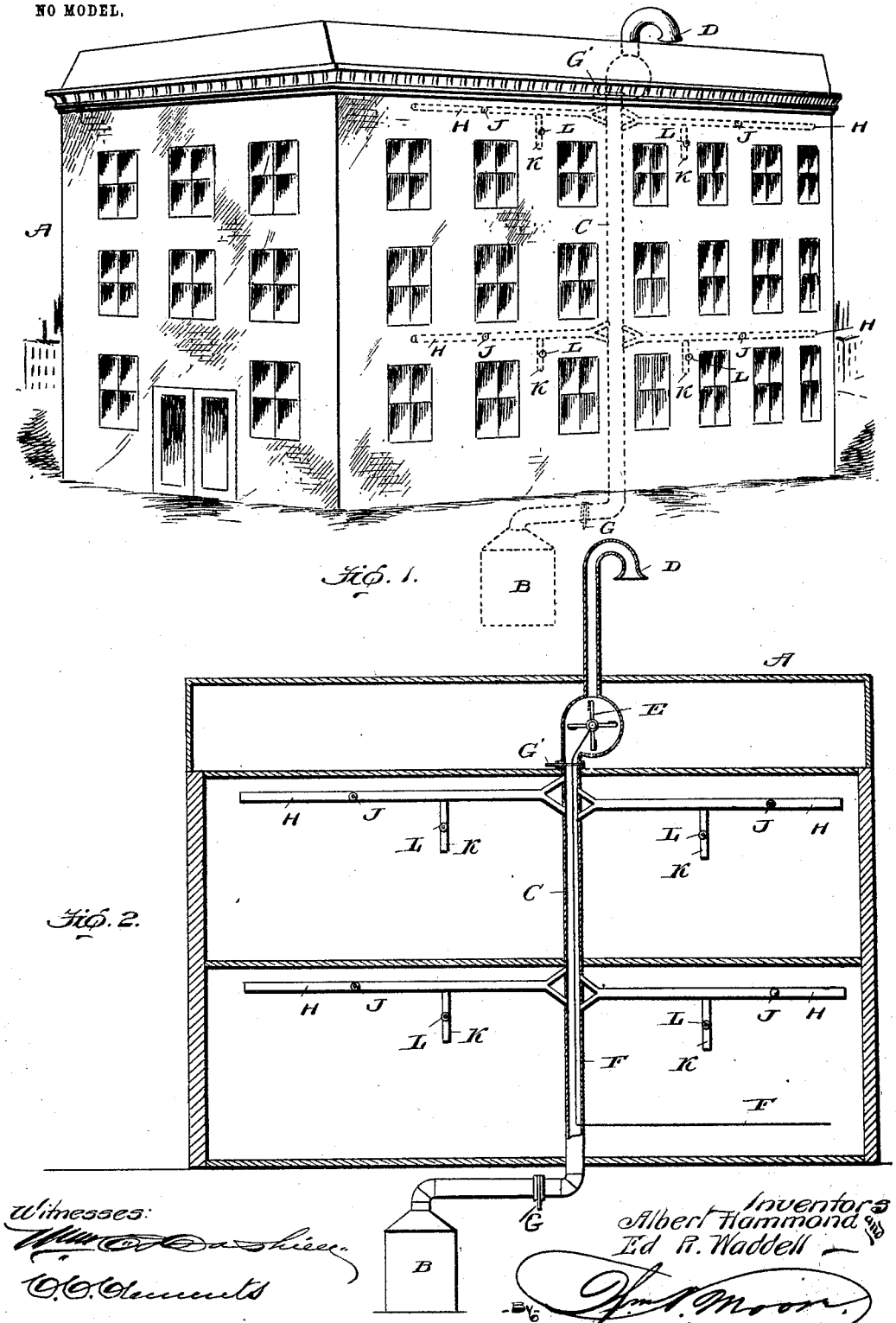

UNITED STATES PATENT OFFICE.

ALBERT HAMMOND AND EDWARD R. WADDELL, OF PARAGOULD, ARKANSAS.

HEATING OR COOLING APPARATUS.

SPECIFICATION forming part of Letters Patent No. 718,928, dated January 20, 1903.

Application filed June 6, 1901. Serial No. 63,395. (No model.)

*To all whom it may concern:*

Be it known that we, ALBERT HAMMOND and EDWARD R. WADDELL, citizens of the United States, residing at Paragould, in the county of Greene and State of Arkansas, have invented certain new and useful Improvements in Heating or Cooling Apparatus, of which the following is a specification.

Our invention relates to improvements in apparatus for heating and cooling buildings; and the object of our invention is the provision of an apparatus which can be constructed at a comparatively low price and which will prove practical and reliable for heating buildings or for cooling them, as found desirable.

To attain the desired object, our invention consists of a combined heating and cooling apparatus embodying novel features of construction and combination of parts, substantially as disclosed herein.

Figure 1 represents a view of a building, showing our improvements applied, the invention being shown in elevation; and Fig. 2 represents a similar view with the parts of our invention broken away or in section to show the interior details.

A designates a building or other structure in connection with which we use our improvements, and connected with the furnace B to receive the heat therefrom is the pipe or conductor C, which may be located in the building or upon the outside, as shown. This conductor extends to and above the top of the structure and is formed with the downturned funnel D to prevent entrance of rain, snow, or heavy winds or to act as a protector. To the conductor we attach a fan E, operated by electricity through the conducting-wire F, which leads to a suitable source of supply, and the fan serves to force the cool air into the conductor or to draw out the foul air, as circumstances require. The conductor is provided with the lower cut-off G and the upper cut-off G', and at different places from the conductor leads the branch pipes H, which are for conducting heat or cool air to the rooms of the structure, and these pipes are provided with dampers J for closing them. Also in communication with the conductor or through the medium of the branch pipes are the downward-extending short pipes K, which are provided with cut-offs or dampers L, and the purpose of these pipes is to allow the bad air to be drawn from the room for purposes of ventilation.

It will thus be seen that by our improvements we can utilize the heated air from the usual furnace and carry it to the rooms of the building and not allow any to escape and be lost, or we can use the conductor to carry cold air through the pipes to the rooms to cool the rooms, thus making the device useful in winter or summer, and the improvements being of simple, inexpensive, and practical construction they will commend themselves.

As will be seen best in Fig. 2, the connections of the lateral branches with the main conductor are so disposed that the communication therebetween in opposite branches shall be out of alinement with each other, so as to better facilitate the passage of the air from the main conductor to the branches and provided for even distribution through the opposite branches.

We claim—

1. The improved heating and cooling apparatus herein described consisting of a heat-supply, the main conductor leading therefrom and extended upwardly, a downturned funnel extended above the roof, an offset enlargement between said funnel and conductor with the inlet and outlet to said enlargement in different vertical planes, a fan mounted within said enlargement, an electrical conducting-wire passed through said conductor and connected with said fan, a lower cut-off in said conductor, an upper cut-off in said conductor adjacent said enlargement, lateral branch pipes extending from said conductor and provided with dampers, and depending short pipes extending from said branches and provided with dampers, all substantially as herein shown and described.

2. The improved heating and cooling apparatus herein described consisting of a heat-supply, the main conductor leading therefrom and extended upwardly, a downturned funnel extended above the roof, an offset enlargement between said funnel and conductor with the inlet and outlet to said enlargement in different vertical planes, a fan mounted within said enlargement, an electrical conducting-wire passed through said conductor and connected with said fan, a lower cut-off in said conductor, an upper cut-off in said conductor adjacent said enlargement, lateral branch pipes extending from said conductor and provided with dampers, and depending short pipes extending from said branches and provided with dampers, the connection between opposite branches and the main conductor being upon different vertical planes.

In testimony whereof we affix our signatures in presence of two witnesses.

ALBERT HAMMOND.
ED. R. WADDELL.

Witnesses:
L. C. THOMPSON,
J. S. BRINKLEY.